United States Patent [19]
McCleer

[11] Patent Number: 6,075,302
[45] Date of Patent: Jun. 13, 2000

[54] BRUSHLESS HETEROPOLAR INDUCTOR MACHINE

[76] Inventor: Patrick J. McCleer, 1116 S. Bowen St., Jackson, Mich. 49203

[21] Appl. No.: 08/954,513

[22] Filed: Oct. 20, 1997

[51] Int. Cl.$^7$ .............................. H02K 19/00; H02P 7/00
[52] U.S. Cl. ......................... 310/166; 310/162; 310/165; 310/180
[58] Field of Search .................................... 310/162, 166, 310/168, 165, 180, 181, 184, 190, 159, 254

[56] References Cited

U.S. PATENT DOCUMENTS

| | | | |
|---|---|---|---|
| 3,866,104 | 2/1975 | Heine | 310/49 |
| 3,978,356 | 8/1976 | Spiesberger | 310/162 |
| 4,038,575 | 7/1977 | Norbedo | 310/179 |
| 4,642,494 | 2/1987 | Lundin et al. | 310/162 |
| 4,769,567 | 9/1988 | Kurauchi et al. | 310/156 |
| 4,883,999 | 11/1989 | Hendershot | 310/254 |
| 4,995,159 | 2/1991 | Hancock et al. | 310/42 |
| 5,015,903 | 5/1991 | Hancock et al. | 310/168 |
| 5,111,095 | 5/1992 | Hendershot et al. | 310/168 |

FOREIGN PATENT DOCUMENTS 1-152-990  6/1989  Japan ................................ H02P 6/02

OTHER PUBLICATIONS

A.K. Das Gupta, "An Analytical Method to Find the Best Number of Stator and Rotor Teeth of Inductor Alternator for 3–Phase Sinusoidal Voltage Generation", *AIEE Trans. on Power Apparatus and Systems*, vol. 79, Oct. 1960, pp. 674–679.

A.K. Das Gupta, "Mathematical Analysis of Inductor Alternators", *AIEE Trans. on Power Apparatus and Systems*, vol. 79, Oct. 1960, pp. 684–689.

P.K. Dash and A.K. Das Gupta, "Inductance Coefficients of Three–Phase Inductor Alternators: Part I—Analytical Study", *AIEE Trans. on Power Apparatus and Systems*, vol. 88, No. 11, Nov. 1969, pp. 1725–1730.

P.K. Dash and A.K. Das Gupta, "Inductance Coefficents of Three–Hase Inductor Alternators: Part II—Numerical and Experimental Results", *AIEE Trans. on Power Apparatus and Systems*, vol. 88, No. 11, Nov. 1969, pp. 1718–1724.

Japanese Abstract 2–051391, Ban, "Reluctance Type Motor", Feb. 21, 1990.

Japanese Abstract 3–103091, Ban, "Three–Phase Reluctance Motor", Apr. 30, 1991.

*Primary Examiner*—Nicholas Ponomarenko
*Assistant Examiner*—Burton Mullins
*Attorney, Agent, or Firm*—Young & Basile, P.C.

[57] ABSTRACT

A multiple phase heteropolar inductor electrical machine utilizing relatively movable stators and rotors wherein the rotors include electrical winding for producing electricity. The stators and rotors are spaced as to produce an electrical balancing among the machine phases. Preferably, a balance is achieved in the energy conversion process as measured over any given one-half electrical cycle within that phase. The machine substantially achieves equal and balanced peak torque per amp performance within a half cycle of operation of any given phase through the spacing between the stator and elements.

2 Claims, 9 Drawing Sheets

BRUSHLESS HETEROPOLAR INDUCTOR MACHINE

BACKGROUND OF THE INVENTION

1. Field of the Invention

The present invention is in the field of brushless alternating current synchronous electrical machines in which heteropolar field excitation is supplied from field windings or permanent magnets contained in the stator.

2. Description of the Related Art

In an MS thesis published in 1958 and in two technical papers published in October, 1960, A. K. Das Gupta described a then new implementation of a three-phase heteropolar inductor electrical machine. These references are:

1. A. K. Das Gupta "An Analysis of One type of Inductor Alternator", MS Thesis, University of Wisconsin, Madison, Wis., 1958.
2. A. K. Das Gupta, "An Analytical Method to Find the Best Number of Stator and Rotor Teeth of Inductor Alternator for 3-Phase Sinusoidal Voltage Generation", *AIEE Trans. on Power Apparatus and Systems*, Vol. 79, Oct. 1960, pp. 674–679.
3. A. K. Das Gupta, "Mathematical Analysis of Inductor Alternators", *AIEE Trans. on Power Apparatus and Systems*, Vol. 79, Oct. 1960, pp. 684–689.

Figure 1:
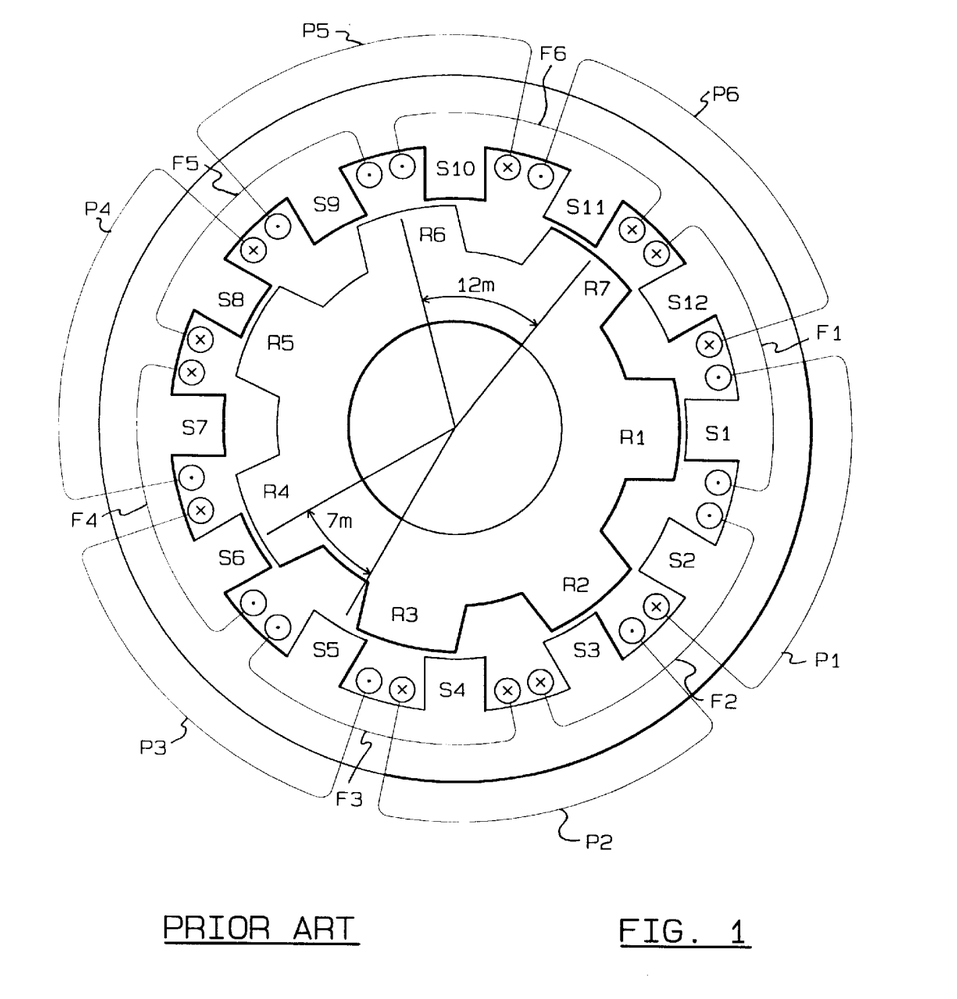
FIG. 1 is a cross-section of a prior art three-phase heteropolar inductor machine.
Figure 2:
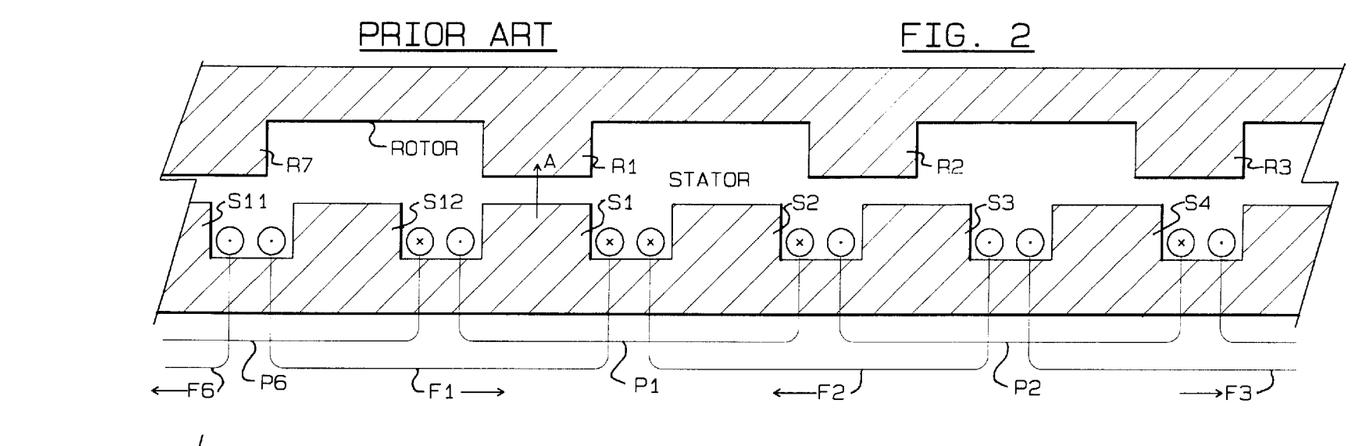
FIG. 2 is a portion of a developed cross-section of a prior art three-phase heteropolar inductor machine showing complete alignment of one stator and one rotor tooth.
Figure 3:
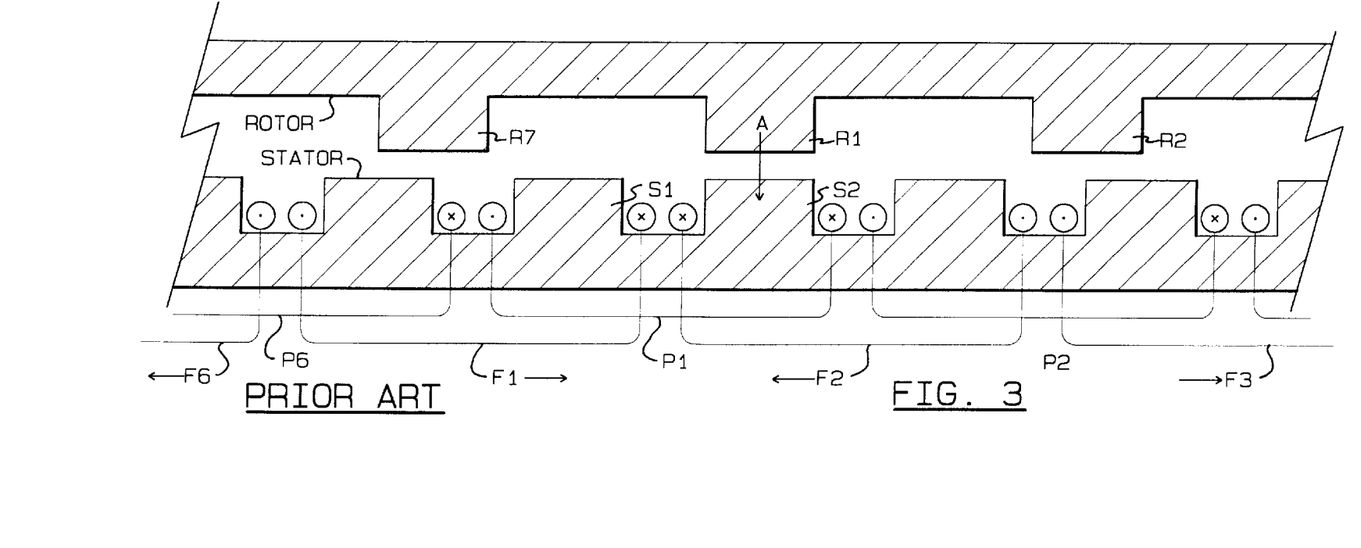
FIG. 3 is a portion of a developed cross-section of a prior art three-phase heteropolar inductor machine showing complete alignment of one stator and one rotor tooth, the alignment state being after rotor movement of one stator tooth pitch from the alignment state shown in FIG. 2.

Gupta and a colleague, P. K. Dash, later published three additional papers on the design and analysis of this type of machine in the November 1969 IEEE Transaction on Power Apparatus and Systems, but the essence of the machine operation is fully disclosed in Gupta's first three publications. As originally described by Gupta, the typical three-phase machine structure is shown in FIG. 1. An inner rotor of laminated electrical steel construction with seven evenly spaced teeth on its outer surface is enclosed by a laminated stator, which has twelve evenly spaced teeth and slots facing the rotor. The stator slots contain the machine windings. As shown in FIG. 1, these windings form coils, each coil subtending two stator teeth. The coils, twelve in all, are interleaved with one another. Six of the coils, P1 through P6, are stator phase coils and conduct AC phase currents, two coils per phase. The remaining six coils, F1 through F6, alternating in position with the phase coils, are field coils which conduct direct current (DC) and can all be separately driven, or jointly driven, connected in series or in shunt, or in some series/shunt combination. The current in these field coils excites field magnetic flux, which then flows in closed paths in the stator and rotor structures. The value and sign of this field flux in any particular path in the stator is dependent on the position of nearby rotor teeth. For example, in the linear or developed machine cross-section of FIG. 2, current in field coil F1 in the direction shown will produce field flux A flowing in the path across the air gap from stator tooth S1 to rotor tooth R1. If the rotor advances one stator tooth pitch to the position shown in FIG. 3, then flux A flowing in rotor tooth R1 reverses and switches its stator path from stator tooth S1 to stator tooth S2. The direction of flux A through stator phase coil P1 reverses since the source of its field excitation also switches from the ampere turns in field coil F1 to the ampere turns in field coil F2. Thus for continuous rotor motion, as rotor teeth pass stator teeth, alternating polarity field flux is linked by stator phase coils due to stator field winding DC ampere turns. The variation of field flux linked by the different stator phase coils is in exact time and position synchronism with the variation of rotor movement across the face of the stator. Therefore this machine structure is termed an AC synchronous motor or generator (alternator) dependent on the method of energy conversion, electrical to mechanical or mechanical to electrical.

A complete electrical cycle of operation for the machine FIG. 1 takes place over rotor physical movement of one rotor tooth pitch. Since there are seven rotor teeth there will be seven electrical cycles of operation for each complete rotation of the rotor. This machine is then said to be a fourteen (14) magnetic pole device, with two magnetic poles associated with each AC electrical cycle of operation.

It is desirable in any AC electrical machine to operate in a manner such that the torque acting on the machine elements, created by interaction between the field fluxes and the stator phase winding currents, be a maximum for any given set of values of the phase currents, in either motor or generator mode of operation. In addition, for mechanical and thermal considerations, machine construction should be that which promotes equal levels of energy conversion in any given phase averaged over an electrical cycle for that phase. That is, the machine should be electrically balanced among its phases. Considering any one phase alone, it is also desirable that balance be achieved in the energy conversion process as measured over any given half electrical cycle within that phase. Thus, it is desirable in AC machine design to achieve equal and balanced peak torque per amp performance within a half cycle of operation of any given phase.

The machine construction of FIG. 1 does not lend itself to peak attainable and balanced operation within half cycles of any given phase. As shall be shown, the reason for this is non-electrical symmetry, as seen in any one phase, due to the requirement of equal spacing between teeth on both the stator and rotor structures.

For ease of explanation, let the angular separation between teeth be measured in units that will be integral in value for both the stator and rotor. The largest angular value for this measuring unit, denoted as m, is then $360/(7\times12)$ degrees. The tooth separation or pitch of the rotor is 12 m and the pitch of the stator teeth is 7m. One rotor tooth pitch is equivalent to 360 electrical degrees so in terms of electrical degrees $m=360/12=30°(e)$, with the notation $°(e)$ signifying degrees in an electrical cycle.

The structure of FIG. 1 is not electrically balanced over any one half cycle because the stator teeth are separated by 7m or $210°(e)$. Thus, rotor movement of 6m or $180°(e)$ (i.e. movement equivalent to one half electrical cycle) would not completely reverse the magnetic field flux linking any given stator phase. It takes a 7m move of the rotor to completely reverse the flux within any given phase coil. This 7m move is shown in the beginning and end of movement diagrams of FIGS. 2 and 3, respectively. The voltage induced in any one phase coil due to the field flux change over a complete electrical cycle will have a fundamental component at the fundamental frequency, the inverse of the time extent of an electrical cycle, but it will also have higher harmonic terms due to the non balance between the two half cycles of operation. The harmonic terms will not contribute to the energy conversion process unless they can be matched with corresponding phase current harmonics, not an easily achievable process, and thus they are not desirable.

The structure shown in FIG. 1 is not optimum for an additional reason. There are two coils for each phase in the stator. The coils, which team or are grouped to form the three phases, are P1 and P4, P2 and P5, and P3 and P6. The coils centers for these grouped coils are separated by 180° mechanical thus $7\times180°(e)$. However, for mechanical and electrical alignment of a rotor and stator tooth set in one of the teamed coil phases, there cannot be complete rotor tooth alignment with a stator tooth within the other grouped coil. This forced but undesirable misalignment is seen in FIG. 1, where rotor tooth R1 and stator tooth S1 are completely aligned; but stator tooth S8 on which grouped coil P4 is wound, is slightly misaligned with rotor tooth R5. Since stator teeth S8 and S1 are separated by 7×7m=49m and rotor teeth R1 and R5 are separated by 4×12m=48m, the misalignment is m=30°(e). The voltages induced in individual coils in the pairs P1–P4, P2–P5 and P3–P6 are similarly out of phase (or antiphase) by 30°(e).

Connection of grouped phase coils P1–P4, P2–P5, and P3–P6 in series will still allow completely electrically balanced operation of the machine shown in FIG. 1 but the materials of construction are not utilized in an optimum manner because of the two sources of electrical phase displacement discussed above.

The machine construction shown in FIG. 1 can be extended to 3n phase machines, where n is an integer, n=2,3,4 . . . , where the total number of stator teeth will be 12n and the total number of rotor teeth will be 7n. If uniform separation of the stator and rotor teeth is again imposed, then the 30°(e) phase displacements shown above for a three-phase machine will still apply, except when n is an even number, in which case complete phase alignment between grouped phase coils is naturally achieved.

Given that the simple, rugged, brushless structure of the AC synchronous machine shown in FIG. 1 is desirable, it would be advantageous to modify its internal geometry to achieve better utilization of its materials of construction and therefore a more cost effective, efficient and/or more power dense machine.

OBJECTS OF THE INVENTION

It is an object of the invention to provide a modified and improved stator tooth or field and phase coil spacing construction for a three-phase AC heteropolar synchronous machine in order to achieve complete 180°(e) phase shift of the field flux in any one stator phase coil for rotor movements of one half the rotor tooth pitch and to achieve complete phase (or antiphase) alignment between grouped stator phase coils.

It is another object to provide new constructions for completely balanced 3n phase AC heteropolar synchronous machines, where n is an integer n=2,3,4 . . . These new constructions provide for complete 180°(e) phase shift of the field flux in any one stator phase coil for rotor movements of one half the rotor tooth pitch and for complete phase (or antiphase) alignment between grouped stator phase coils.

Yet another object of the invention is to provide a three-phase heteropolar synchronous inductor machine of a lower magnetic pole order for more effectively producing electricity and achieving maximum and balanced peak torque per amp performance within a half cycle of operation of any given phase.

SUMMARY OF THE INVENTION

The present invention can be embodied in rotating or linearly traveling machine constructions. In rotating embodiments, the rotor structure can be either interior or exterior to the stator, and the air gap can be across a radial or an axial dimension. All embodiments can be operated as either motors or generators. All embodiments can be constructed either with teeth and slots on the stator member or with coils placed directly in the air gap attached to a smooth stator surface (i.e. slotless stator construction).

All embodiments of the present invention can be described through use of a fundamental unit of rotor traveling displacement: angular displacement in a rotating embodiment and linear displacement in a linear embodiment. This fundamental unit of measure, denoted u, is chosen such that all tooth pitch measures or coil side to coil side measures are of integer order.

In a balanced three-phase version of the present invention, there are seven evenly spaced rotor teeth and six evenly spaced stator phase coils, resulting in 7×6=42 units of measure u in a repeatable group. A repeatable group being all machine elements needed to make a complete three-phase machine, i.e. seven rotor teeth, six phase coils and six field excitation structures. These fundamental repeatable groups being capable of integer order repetition as desired. In a lowest order, three-phase embodiment there would be one such fundamental repeatable group. The centers of phase coils in a three-phase machine are separated by a measure of 7u. For embodiments with stator teeth, the two teeth subtended by any one-phase coil have a center to center separation of 3u. Since 6u corresponds to 360°(e), a rotor movement of 3u corresponds to 180°(e) in any particular phase. The center to center separation of closest stator teeth between two stator phases is 4u.

In a balanced six-phase version of the present invention, there are thirteen evenly spaced rotor teeth and twelve evenly spaced stator coils, resulting in 12×13=156 units of measure u in a repeatable group. A repeatable group being equal to all the machine elements needed to make a complete six-phase machine, i.e. 13 rotor teeth, 12 stator phase coils and 12 field excitation structures. As in the three-phase case, repetition of fundamental repeatable groups can be implemented as desired. A measure of 13u separates the centers of phase coils. For embodiments with stator teeth, the two teeth subtended by any one-phase coil have a center to center separation of 6u. The center to center separation of closest stator teeth between two stator phases is 7u.

In general, in a balanced 3n phase version of the present invention, where n is an integer, n=1,2,3 . . . , there are 2×3n+1 evenly spaced rotor teeth and 2×3n evenly spaced stator coils, resulting in (2×3n)×(2×3n+1) units of measure u in a repeatable group. A repeatable group being equal to all the machine elements needed to make a complete 3n phase machine, i.e. 2×3n+1 rotor teeth, 2×3n stator coils and 2×3n field excitation structures. Repetition of fundamental repeatable groups can be implemented as desired. The centers of phase coils are separated by (2×3n+1)u. For embodiments with stator teeth, two teeth subtended by any one-phase coil have center to center separations of 3nu. The center to center separation of closest stator teeth between stator phases is (3n+1)u.

A six-phase toothed stator version of the present invention showing construction details and conforming to the description given herein was disclosed in the following document, said document here being incorporated by reference: Miller, McCleer, and Giacoletto, "A Proposal for Electric Power Plant for Future ICE Powered Vehicles", presented at the 1996 IEEE Workshop on Electronics in Transportation, Dearborn, Mich., Oct. 24–25, 1996.

BRIEF DESCRIPTION OF THE INVENTION

The aforementioned objects and advantages of the invention will be appreciated from the following description and accompanying schematic drawings wherein.

DESCRIPTION OF THE PREFERRED EMBODIMENTS

The present invention is in part comprised of particular methods of design and construction of balanced 3n phase heteropolar inductor electrical machines, where n is an integer, n=1,2,3 . . . These methods of design and construction consist of layout or placement details for stator teeth and/or stator phase coils. As expressed above, a unit measure u along the air gap and in the direction or antidirection of rotor movement is used to describe the layout or placement details of each embodiment. In a rotating radial or axial air gap machine, u is an angular measure. In a linear machine, u is a measure of linear distance. This unit measure is chosen such that all teeth pitches and coil spans of interest are of integer order. In general, u is defined as the extent (angular or linear) of one repeatable group of machine elements divided by the product of the number of stator phase coils and rotor teeth within that group. The measure u is used to specify exact, uneven placement of stator teeth centers, or stator phase coil sides in a slotless stator machine, such that improved machine performance is attained over that exhibited by machines with complete uniformity along the stator air gap surface.

Figure 4:
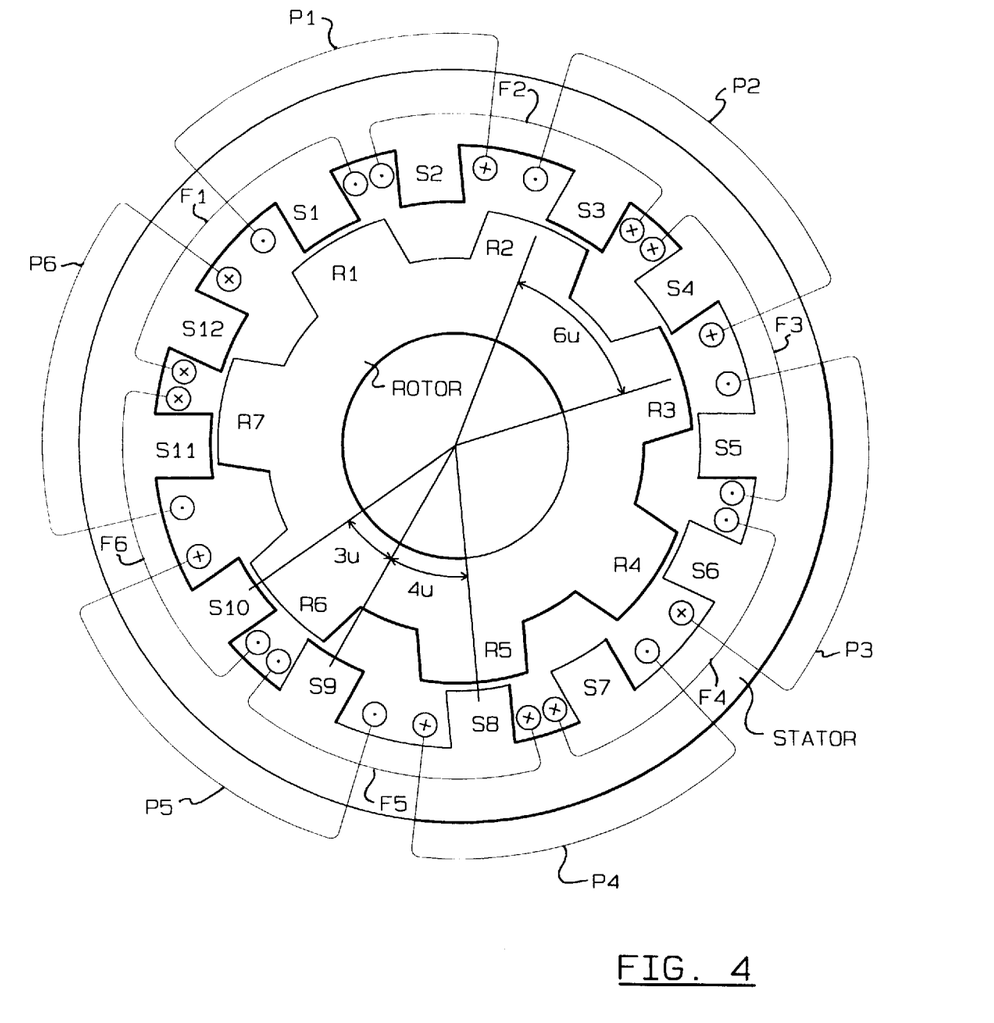
FIG. 4 is a cross-section of an interior rotor three-phase heteropolar inductor machine constructed in accordance with one embodiment of the present invention.

The cross-section of one preferred embodiment of the present invention, that of an interior rotor three-phase machine, is shown in FIG. 4. In this machine, the angular extent of the one and only repeatable group of machine elements is 360°. There are six stator phase coils and seven rotor teeth. The angular measure u is therefore 360°/42, or approximately 8.57°. Rotor tooth center pitch is 6u or 360°(e) such that u=60°(e). Stator phase coils subtend two stator teeth and these six groups of two teeth are uniformly distributed on the stator air gap surface with group centers separated by 7u. The two teeth, which are enclosed by any one phase coil, have centers equidistant from the phase coil center and are separated from each other, center to center by 3u or 180°(e). This new structure of a three-phase machine can be directly compared with the prior art version shown in FIG. 1. The prior art machine had an electrical separation of stator tooth centers subtended by the same phase coil of 210°(e) which precludes balanced phase voltage reversal for synchronized rotor movements of 180°(e). Note, in addition, the complete alignment of stator and rotor teeth S8 and R5 in the new machine which provides for full field flux linkage to stator coil P4 in synchronism with the alignment of teeth R1 and S1 and full field linkage to coil P1. This synchronized alignment of two sets of stator and rotor teeth in the same phase group is impossible in the prior art machine.

Figure 5:
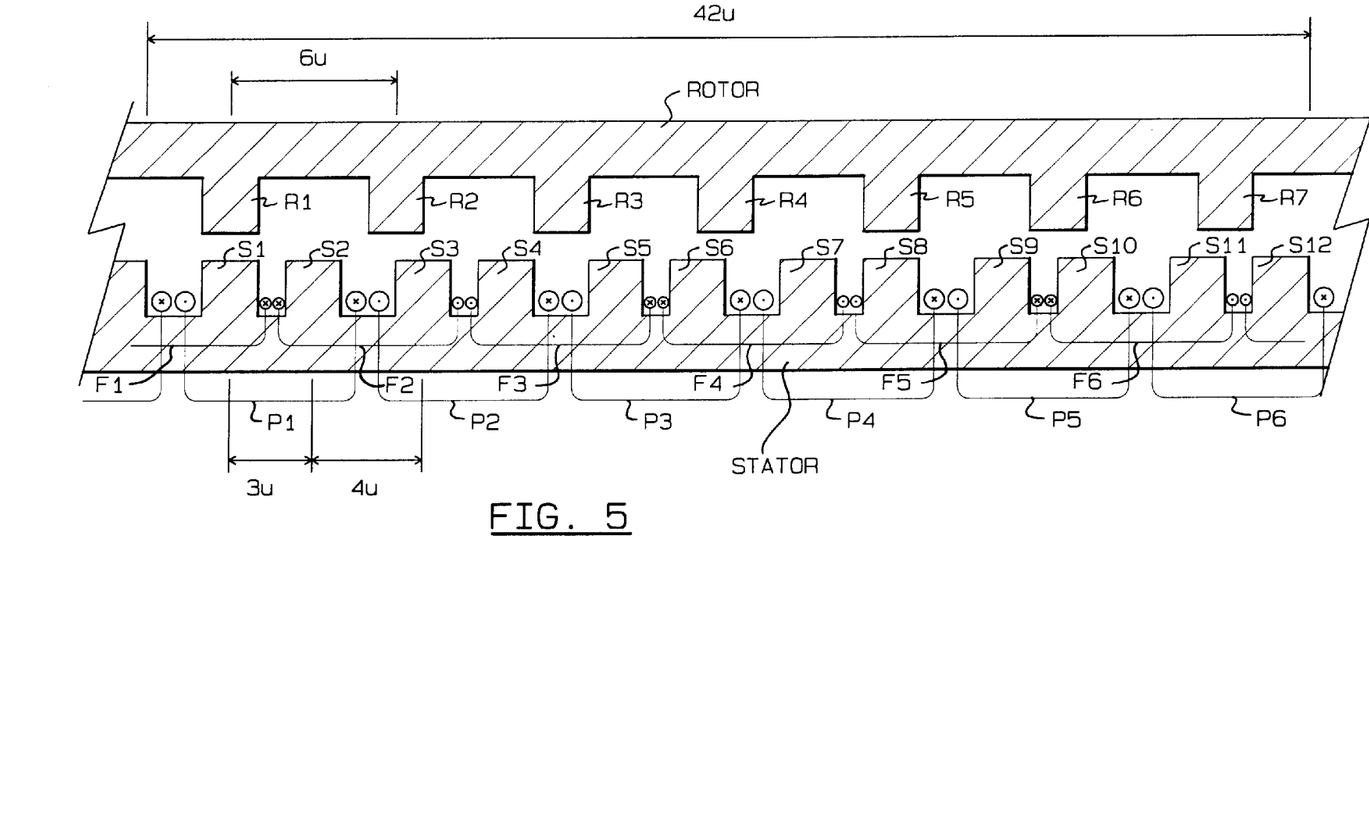
FIG. 5 is a portion of a developed cross-section of a three-phase heteropolar inductor machine constructed in accordance with a linear embodiment of the present invention.

One repeatable group of a three-phase developed or linear preferred embodiment of the present invention is shown in FIG. 5. In terms of the measure u, now linear rather than angular, all corresponding tooth center separations are as given for the rotating machine of FIG. 4. The linear length of one repeatable group of machine elements is 42u.

Figure 6:
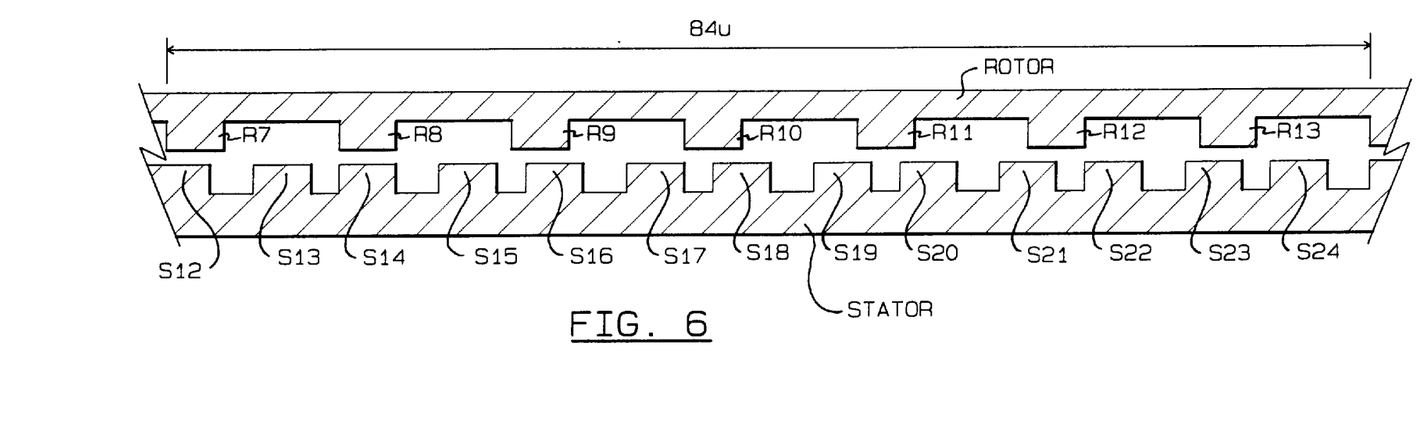
FIGS. 6 and 6A are portions of a developed cross-section of a six-phase heteropolar inductor machine constructed in accordance with another embodiment of the present invention.
Figure 6A:
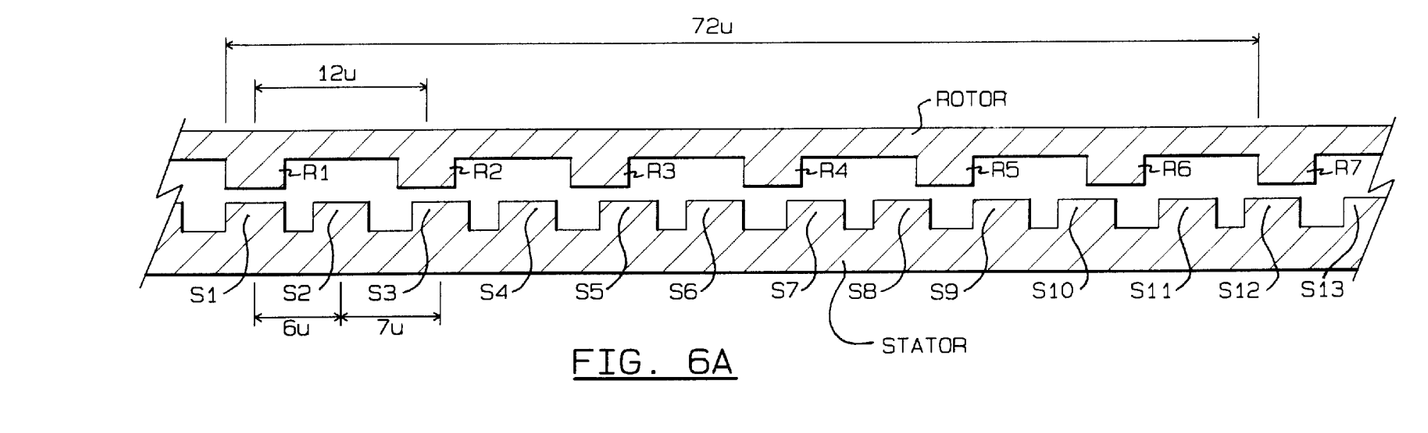

One repeatable group of six-phase developed or linear preferred embodiment of the present invention is shown in FIG. 6. In terms of the linear measure u, the rotor tooth pitch is 12u, stator phase coils are separated by 13u, the two stator teeth subtended by any given phase coils are equidistant, 6u, from that phase coil center, and the center to center separation of closest stator teeth in neighbor phases is 7u. The linear length of one repeatable group of machine elements is 156u.

Figure 7:
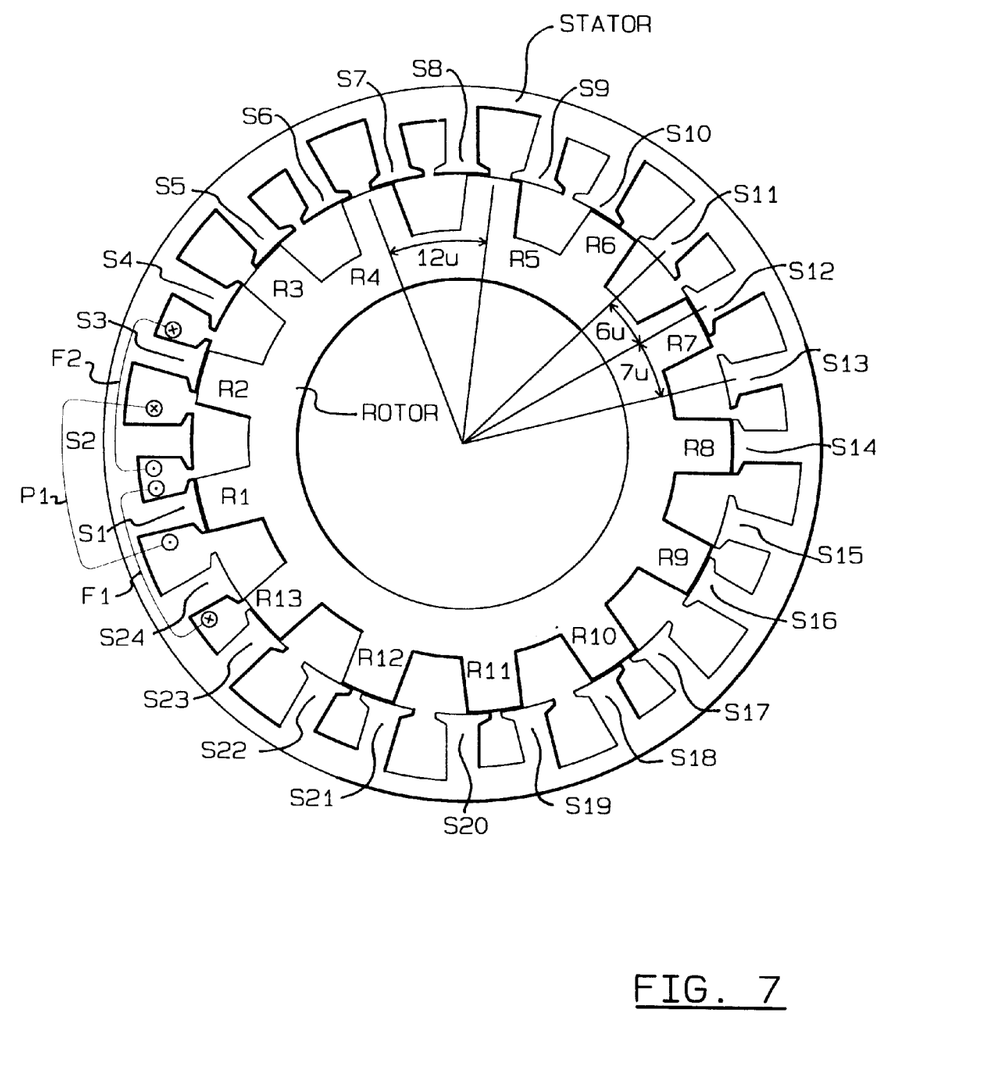
FIG. 7 is a cross-section of an interior rotor six-phase heteropolar inductor machine constructed in accordance with a further embodiment of the present invention.

The preferred embodiment of a six-phase interior rotor machine is shown in FIG. 7. In terms of u, an angular measure of this machine, with u=360°/156, or approximately 2.31°, all the corresponding tooth center separations are as given for the linear machine of FIG. 6.

Figure 8:
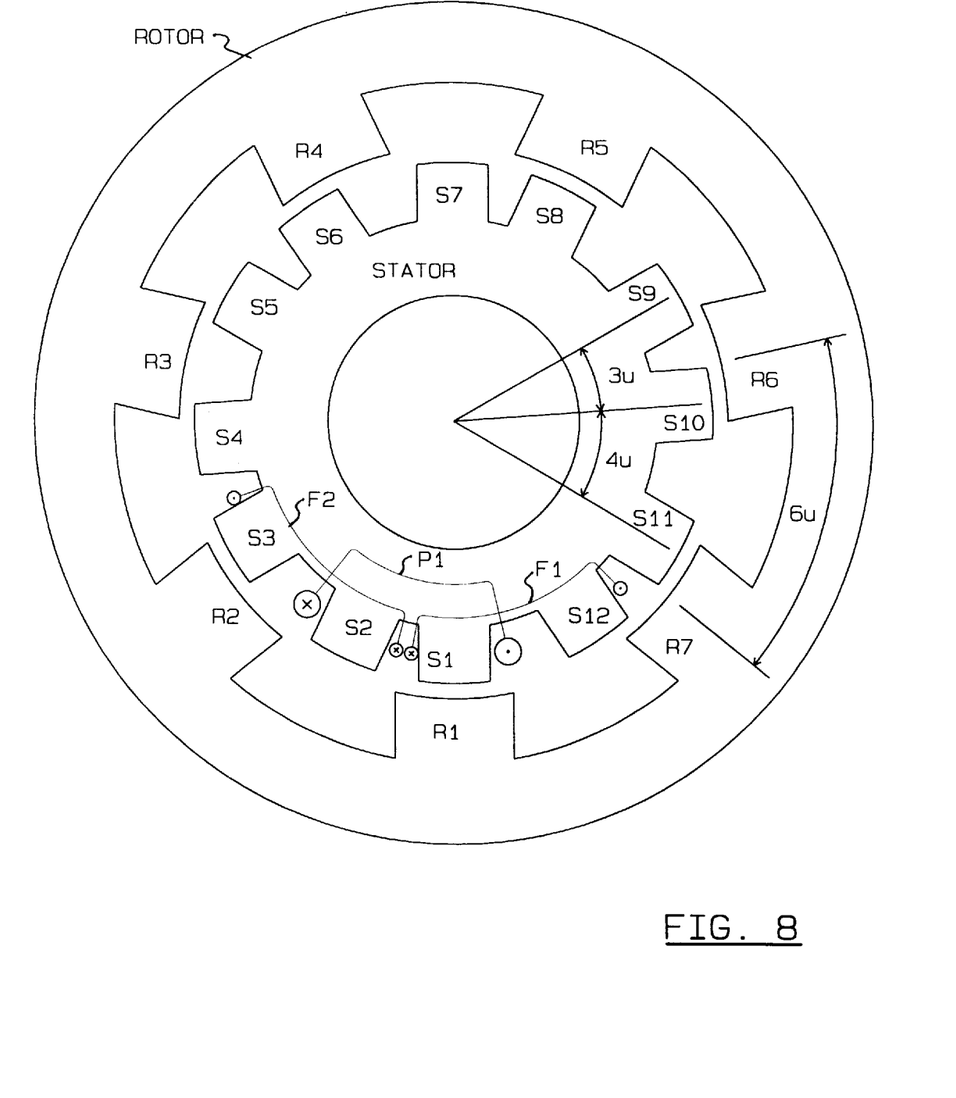
FIG. 8 is a cross-section of an exterior rotor three-phase heteropolar inductor machine constructed in accordance with another embodiment of the present invention.

The cross-section of another preferred embodiment of the present invention, an exterior rotor three-phase machine, is shown in FIG. 8. In terms of the angular measure u, all corresponding tooth center separations are as given for the interior rotor three-phase machine of FIG. 4.

Figure 9:
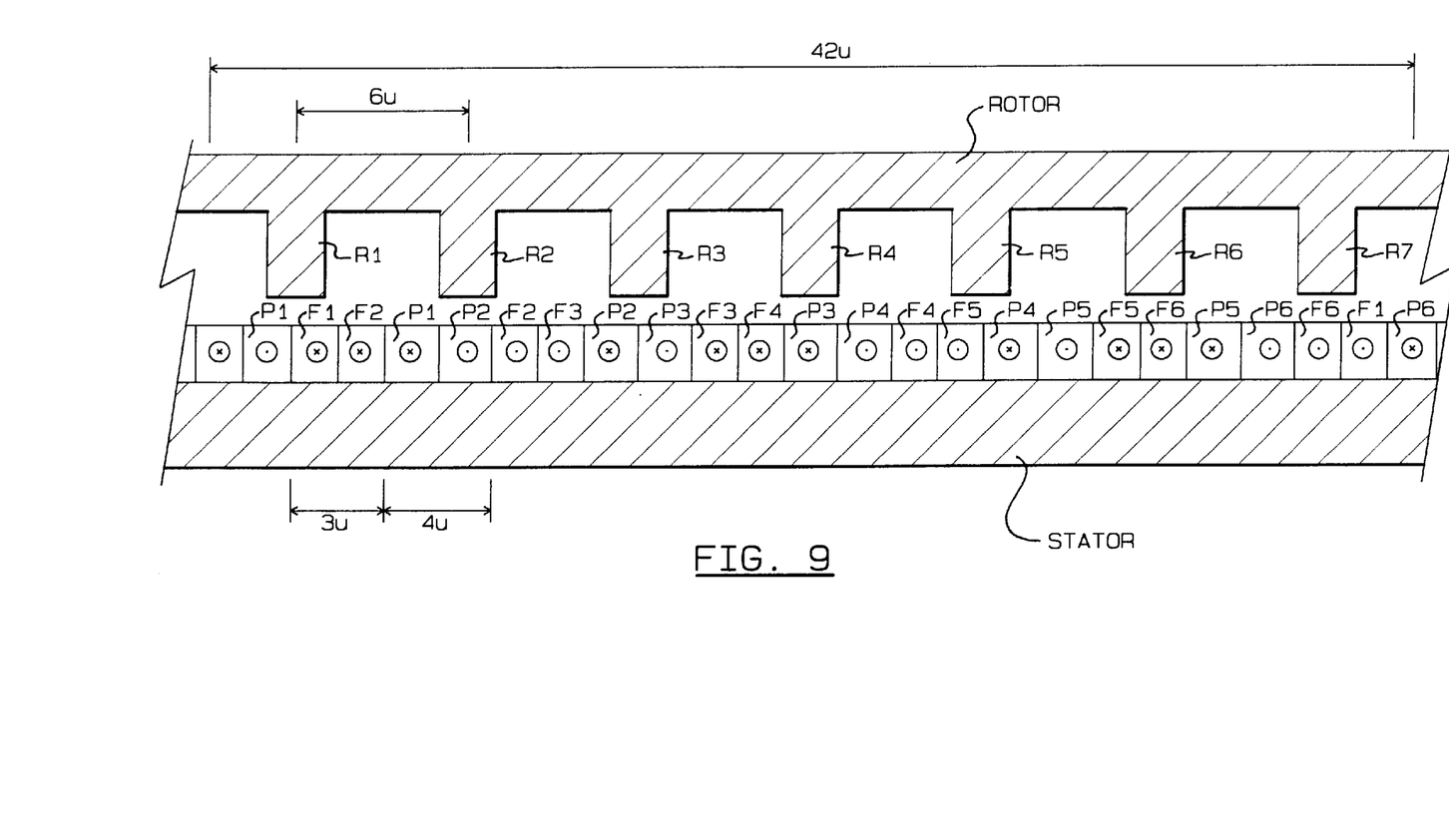
FIG. 9 is a portion of a developed cross-section of slotless stator three-phase heteropolar inductor machine constructed in accordance with an additional embodiment of the present invention.

One repeatable group of a three-phase developed or linear preferred embodiment, constructed without stator teeth, is shown in FIG. 9. The interior span of the stator windings and their placement in terms of the linear measure u correspond with the tooth center to center separation and placement in the toothed embodiment shown in FIG. 5.

Figure 10:
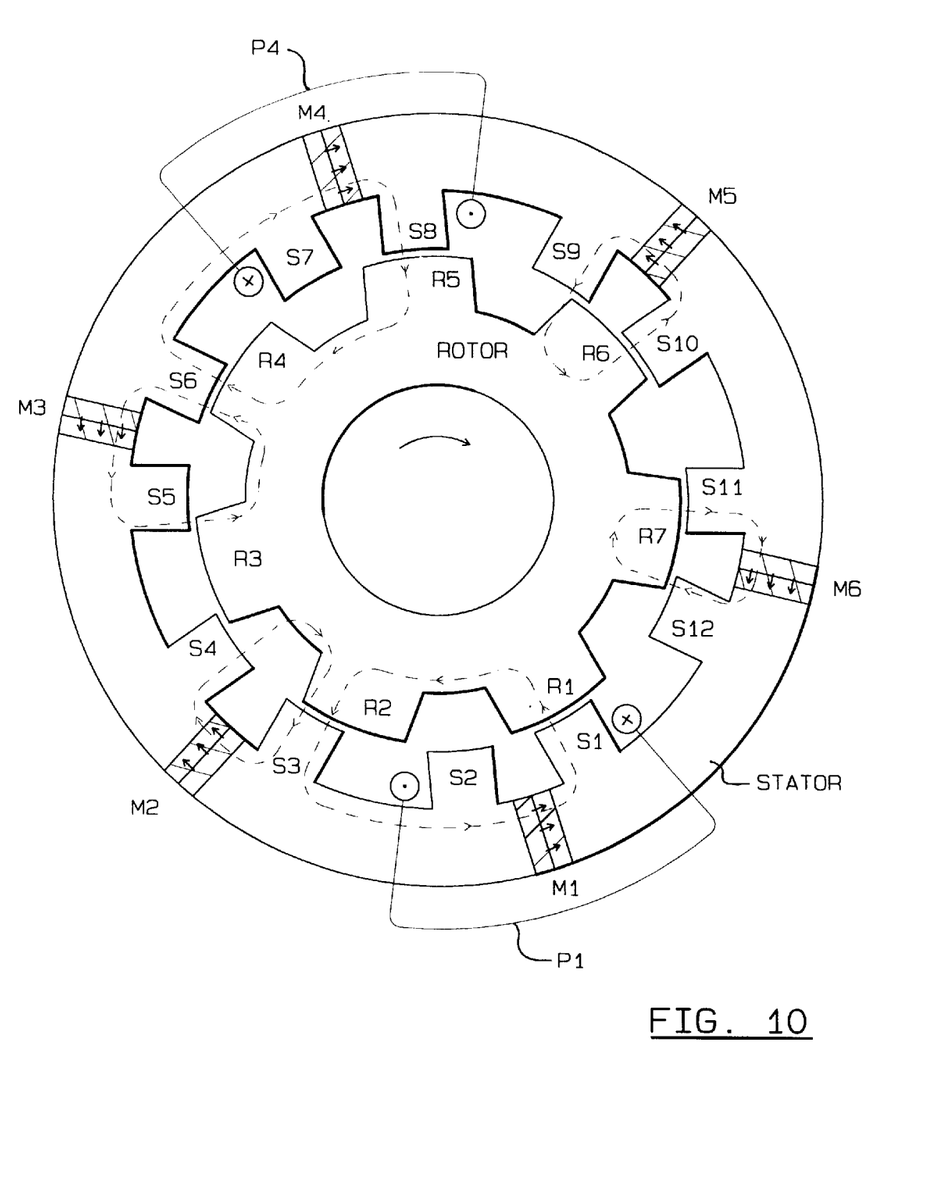
FIG. 10 is a cross-section of an interior rotor three-phase heteropolar inductor machine with permanent magnet field excitation constructed in accordance with yet another embodiment of the present invention.

The cross-section of another preferred embodiment of the present invention, an interior rotor three-phase machine with permanent magnet field excitation, is shown in FIG. 10. In terms of the angular measure u, all corresponding tooth center separations are as given for the field coil excited three-phase machine of FIG. 4. In this embodiment, six segments of permanent magnet material, M1 through M6, are placed within the stator structure, with alternating direction of magnetization as shown, and centered at the six locations corresponding to the centers of the field coils slots in a field winding excited machine. These six magnet segments provide field flux excitation for the machine and are functional replacements for the field coils and the external supply of field current used in a field winding excited machine. If the radial length of these excitation magnet segments is short enough such that the inside radial edge of the magnet segment does not extend to the machine air gap, such as shown in FIG. 10, then some field coil slot space would remain and the field coils such as shown in FIG. 4 could also be employed to form a hybrid excitation machine structure; one which uses both permanent magnets and field winding for excitation.

The descriptions given above of the preferred embodiments are intended as illustrative of the principles of the present invention and are not intended to be limiting. In particular, sizes and relative sizes of machine elements such as stators, rotors, stator teeth, rotor teeth, air gap length, etc., are all subject to variation based on engineering judgment in consideration of the application of the machine in question. Numerous machine configurations constructed to the principles of the present invention are possible and can be readily devised by those skilled in the art. Each of these individual configurations falls within the spirit and scope of this present invention.

What is claimed is:

1. In a multiple phase heteropolar inductor electrical machine having a relatively movable adjacently disposed stator and rotor, said stator having spaced teeth and said rotor having an odd number of spaced teeth, said stator teeth being arranged in an even number of pairs, each pair constituting a phase coil, said stator being magnetically charged, means for relatively displacing said stator and rotor, relative movement between said stator and rotor producing an electrical phased current having a cycle of operation, adjacent stator teeth being non-uniformly spaced from each other and adjacent rotor teeth being uniformly spaced from each other to achieve balanced currents within half cycles of operation of a given phase.

2. In a multiple phase inductor electrical machine having magnetically charged stator teeth and rotor teeth adapted to be relatively movable with respect to the stator teeth, phase coils located between the stator teeth, the stator and rotor teeth having centers, the improvement comprising, wherein the distance between adjacent stator and rotor teeth centers is measured in integral multiples of distance or angle u and wherein u is the extent of one repeatable group of stator teeth and rotor teeth divided by the product of the number of stator phase coils and rotor teeth within said repeatable group wherein in a balanced $3n$ phase machine where n is an integer, there are $2\times3n+1$ evenly spaced rotor teeth and $2\times3n$ evenly spaced stator coils resulting in $(2\times3n)\times(2\times3n+1)$ units of measure u in a repeatable group.

* * * * *